United States Patent
Baxter, III et al.

(10) Patent No.: US 6,489,961 B1
(45) Date of Patent: Dec. 3, 2002

(54) RASTERIZATION OF LINES IN A CYLINDRICAL VOXEL GRID

(75) Inventors: William V. Baxter, III, Durham, NC (US); Michael G. Giovinco, Cambridge, MA (US)

(73) Assignee: Actuality Systems, Inc., Reading, MA (US)

( * ) Notice: Subject to any disclaimer, the term of this patent is extended or adjusted under 35 U.S.C. 154(b) by 12 days.

(21) Appl. No.: 09/691,574

(22) Filed: Oct. 17, 2000

(51) Int. Cl.$^7$ ............................................... G06T 17/00
(52) U.S. Cl. ....................... 345/424; 345/422; 345/423; 345/6
(58) Field of Search ................................. 345/424, 422, 345/6, 419, 423, 420, 623, 624

(56) References Cited

U.S. PATENT DOCUMENTS 5,515,484 A * 5/1996 Sfarti et al. ................. 345/424
5,754,147 A * 5/1998 Tsao et al. ...................... 345/6

OTHER PUBLICATIONS

Foley, Computer Graphics Principles and Practice, 1995, Addison–Wesley Publishing Company, 2$^{nd}$ Edition, pp. 74–78.*

* cited by examiner

Primary Examiner—Mark Zimmerman
Assistant Examiner—Kimbinh T. Nguyen
(74) Attorney, Agent, or Firm—Fish & Richardson P.C.

(57) ABSTRACT

In a cylindrical coordinate system, the dominant direction of a line changes in a predictable manner. A rasterizer uses this fact to efficiently render a desired line on a volumetric display. It does do by determining whether first and second points on the desired line are on first and second constituent line-segments of the desired line, the first and second constituent line-segments having different dominant directions. On the basis of the determination, the rasterizer renders a second voxel representative of the second point on the desired line by incrementally proceeding from a first voxel representative of the first point. The location of the second voxel is selected to minimize a distance between that second voxel and the desired line.

20 Claims, 13 Drawing Sheets

RASTERIZATION OF LINES IN A CYLINDRICAL VOXEL GRID

This application contains a computer program listing submitted on CD-ROM created Aug. 30, 2002.

This invention relates to computer graphics, and in particular, to the rendering of a straight line on a display in which the voxels are arranged on a cylindrical coordinate grid.

BACKGROUND

Many computer-implemented displays consist of two-dimensional arrays of individual picture elements, or pixels. To form an image, a rasterizer selectively colors the pixels. Because the individual pixels are so small, the display appears to a human viewer to be a continuous rendering of an image. This illusion is particularly effective for complex images of continuous tones such as photographs.

For simple geometric shapes, however, the pixelated nature of the display can become apparent to the human viewer. For example, if the rasterizer is instructed to draw a straight line, there is no guarantee that the points on that desired line will coincide with the pixels that are available for rendering the line. As a result, the desired line is often rendered by a rasterized line of pixels that are close to but not necessarily coincident with the desired line. This results in rasterized lines that have a jagged or echeloned appearance.

In the course of rendering an image, a large number of straight lines and line segments are often drawn. As a result, given a desired line, the rasterizer must frequently select those pixels that will minimize the jagged appearance of the resulting rasterized line. A straightforward mathematical approach is to use the equation of the desired line and the coordinates of the available pixels to minimize a least square error across all points on the line. While such an approach has the advantage of globally optimizing the selection of pixels on the rasterized line, the large number of floating point operations required causes this approach to be prohibitively time-consuming.

To meet constraints on speed, rasterizers typically implement rasterization methods that avoid time-consuming floating point operations. Among the methods that meet the foregoing constraints is that taught in Bresenham, J. E., "Algorithm for Computer Control of a Digital Plotter," IBM System Journal, Vol. 4, pp. 25–30, 1965, the contents of which are herein incorporated by reference. Using only integer operations, the Bresenham algorithm reduces the choice of what pixel to select to an examination of the sign of a discriminant.

Even faster rasterization methods exist that select multiple points on the rasterized line based on the outcome of a single decision. There also exist a variety of rasterization methods aimed at rendering conic sections and quadric sections on a pixelated display.

However, the foregoing rasterization methods all rely on the assumption that the array of pixels is arranged in a uniform rectangular grid that can readily be modeled by a Cartesian coordinate system. This is a reasonable assumption given the prevalence of two-dimensional displays such as computer monitors and printers at the time these algorithms were developed.

Since then, however, volumetric, or three-dimensional displays have been developed. Such displays permit the generation, absorption, or scattering of visible radiation from a set of localized and specified regions within a volume. Examples of such systems are taught in Hirsch U.S. Pat. No. 2,967,905, Ketchpel U.S. Pat. No. 3,140,415, Tsao U.S. Pat. No. 5,754,147 and on pages 66–67 of *Aviation Week,* Oct. 31, 1960.

In a typical volumetric display 1, shown in FIG. 1, a motor 2 spins an imaging plate 3 rapidly about an axis 4. A light source 5 under the control of a rasterizer 6 illuminates selected spots 7 on the imaging plate 3 at successive instants. If the imaging plate 3 spins rapidly enough, and if the successive instants are separated by short enough time intervals, a continuous curve will appear to hang in mid-air.

FIG. 2 illustrates the projection 8 onto a plane perpendicular to the axis 4 of an exemplary line rendered by the rasterizer 6. In FIG. 2, the imaging plate 3 is shown in six successive instants as it rotates around the axis 4, now perpendicular to the page. At each of the six instants, the light source 5, under the control of the rasterizer 6, illuminates a spot 7 on the imaging plate 3. As shown in FIG. 2, by aiming the light source 5 at the correct spot and firing the light source 5 at the right time, it is possible to trace out the line. It is the function of the rasterizer 6 to correctly aim and fire the light source 5 so as to trace out the line.

To aim the light source 5, the rasterizer 6 needs a way to identify points in space. In other words, the rasterizer 6 needs a coordinate system. One possible coordinate system is a Cartesian coordinate system.

Using a Cartesian coordinate system, the rasterizer 6 would draw the line 8 in FIG. 2 by specifying, for example, that at time $t_1$, the light-source 5 should aim 30 units north, at time $t_2$, the light-source 5 should aim 29 units north, 1 unit east and 1 unit in elevation, at time $t_3$, the light-source 5 should aim 28 units north, 2 units east and 2 units in elevation, and so on. To ensure that the imaging plate 3 is at the appropriate location, the rasterizer 6 also has to specify the values of the times $t_1$, $t_2$ and $t_3$ based on how fast the imaging plate 3 is spinning. Although the spinning of the imaging plate 3 can be resolved into a north-south component and an east-west component, this is a computationally taxing exercise that can easily be avoided by using a polar coordinate system.

As an alternative, the rasterizer 6 could draw the line in FIG. 2 in cylindrical coordinates by specifying, for example, that at time $t_1$, the light source 5 should aim 30 units away from the axis 4 at a 90 degree angle, at time $t_2$, the light source 5 should aim 29.02 units from the axis 4 at an angle of 88.03 degrees and point up by 1 unit of elevation, and at time $t_3$, the light source 5 should aim at 28.07 units from the axis 4 at an angle of 85.91 degrees and point up by 2 units of elevation. This would, of course, draw the same line that was drawn using Cartesian coordinates. The advantage of using cylindrical coordinates becomes apparent when it comes time to specify when to fire the light source 5. Because the imaging plate 3 is spinning, it is far more natural to represent its motion in terms of degrees per second than it is to resolve its motion into a north-south component and an east-west component. For this reason, calculations involving motion of the imaging plate 3 in a volumetric display are best performed in terms of a cylindrical coordinate system.

The process of rendering a line in a cylindrical coordinate system is fundamentally different from that of rendering a line in a Cartesian coordinate system. In a Cartesian coordinate system, a line has a constant slope. A unit change in one direction always results in the same change in the remaining two directions, regardless of where that change occurs. This is not the case in a cylindrical coordinate system.

In a cylindrical coordinate system, the slope of a line can vary dramatically with position along the line. In contrast to a Cartesian coordinate system in which the slope of a line is constant at all points on the line, the slope of a line in a cylindrical coordinate system can vary significantly along the line. This is because the coordinate grid in a cylindrical coordinate system is not a spatially uniform grid, as is the coordinate grid in a Cartesian coordinate system.

For those portions of the line that are closest to the axis of the cylindrical coordinate system, the change in distance of the line from the origin changes very slowly with angle. For those portions of the line that are far from the axis of the cylindrical coordinate system, even a small change in angle results in a huge change in radial distance from the axis.

SUMMARY

A rasterizer according to the invention recognizes that the dominant direction of a desired line in a cylindrical coordinate system changes in a predictable manner. The rasterizer uses this predictable sequence of dominant directions, referred to as a "dominance progression," to avoid having to determine the dominant direction at each point on the desired line before rendering a voxel representative of that point. Instead, the rasterizer detects boundaries between constituent line-segments of the desired line and uses the dominance progression to determine the dominant direction of the line at any point. Because the process of detecting a transition between boundaries is much faster than that of evaluating a dominant direction, a rasterizer practicing the method of the invention can rapidly and efficiently draw a rasterized line in a cylindrical coordinate system.

The rasterizer renders, on a volumetric display, a rasterized line that approximates a desired line. It does so by rendering, on the volumetric display, a first voxel representative of a first point from the desired line. The first point is selected from a first constituent line-segment having a first dominant direction. Then, the rasterizer selects a second point from the desired line and determines whether that second point is on a second constituent line-segment, with a second dominant direction, or whether that second point is on the same constituent line segment.

On the basis of this determination, the rasterizer renders a second voxel representative of the second point on the desired line. This second voxel is located so as to minimize a distance between the second voxel and the second point on the desired line. The second voxel can be selected, for example, by application of a midpoint method to select the second voxel from a plurality of candidate voxels.

In one practice of the invention, the rasterizer evaluates a difference between a threshold and a transition-indicating expression evaluated at the second point. This difference is indicative of a transition from the first constituent line-segment to the second constituent line-segment. The transition indicating-expression is typically an expression whose value depends on a slope of the desired line at the second point. The slope can be defined as a ratio of how much the desired line changes in the first dominant direction with respect to a change in one of two non-dominant directions.

In some cases, the orientation of the line to be rasterized is such that the transition cannot be reliably detected. This occurs, in part, because of computation on a digital computer cannot be carried out with infinite precision. In one practice of the invention, erroneous transitions are avoided by selecting the transition-indicating expression to be one that identifies a line having a point at which the slope is equal to the threshold.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
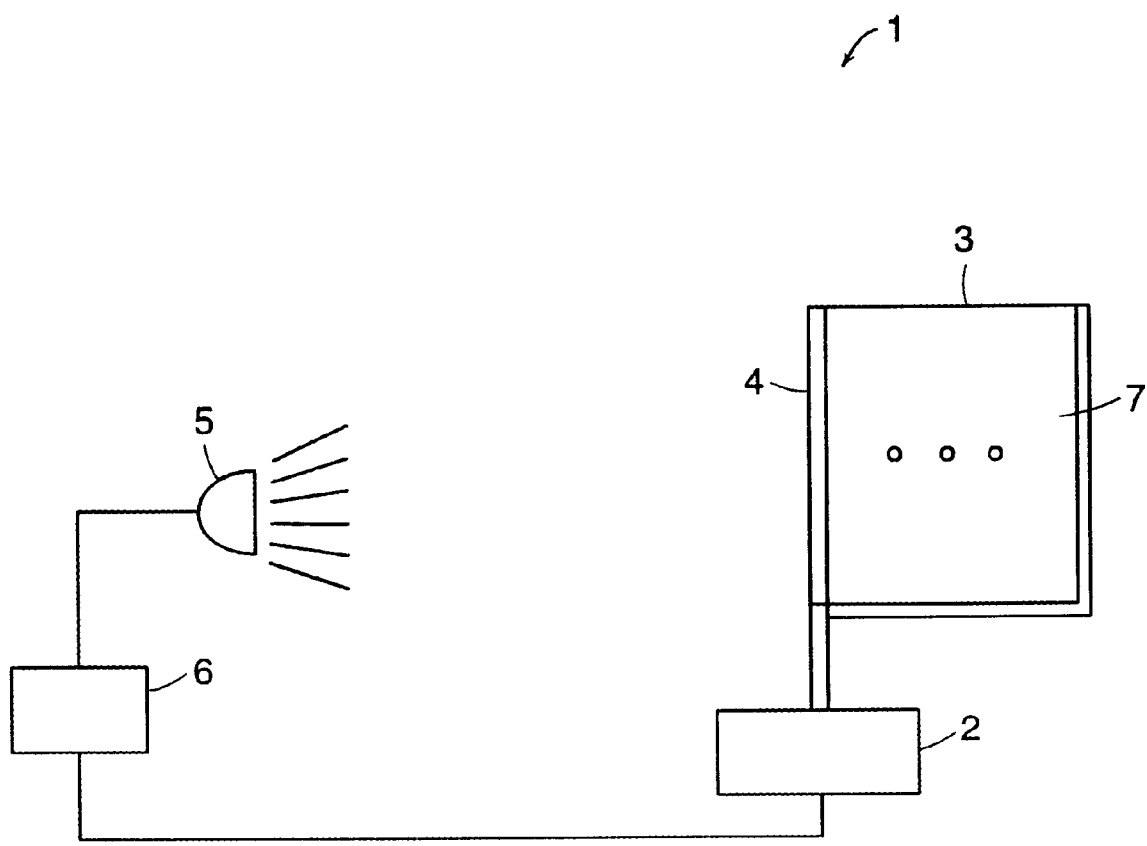
FIG. 1 shows a volumetric display for practice of the rasterization method of the invention.
Figure 2:
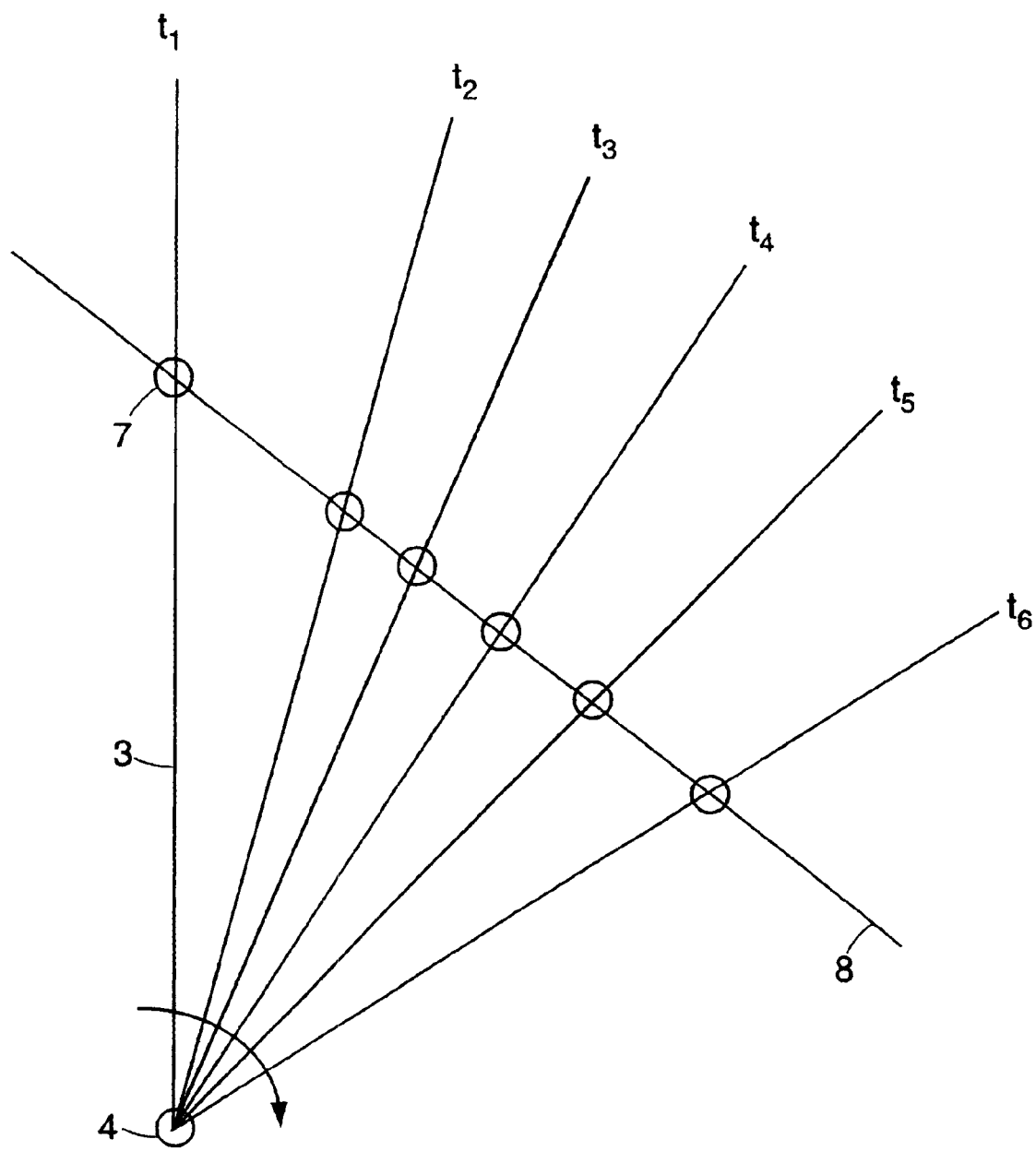
FIG. 2 is a projection of a desired line on the r-θ plane.

A line traversing a cylindrical coordinate system defines a sequence of points, each of which is defined by a radial coordinate r, an angular coordinate θ, and an axial coordinate h. As one traverses the line, these points change by different amounts depending on the direction of the line. For example, if the line is nearly parallel to the axis of the cylindrical coordinate system (hereafter referred to as the "axis"), r and θ will change by only small amounts compared to the change in h. Such a line is referred to as "h-dominant" because its dominant direction is the axial direction. If the line passes through the axis of the cylinder and deviates only slightly from a plane orthogonal to that axis, then θ will never change at all and h will change by only a small amount. Such a line is referred to as "r-dominant" because its dominant direction is the radial direction. For short lines that do not pass through the axis, θ may change more rapidly than either r or h. Such lines are said to be "θ-dominant" because their dominant direction is the angular direction.

As a general rule, the dominant direction of a line in a cylindrical coordinate system changes as one traverses the line. It is useful therefore to consider a line as a concatenation of line-segments, each of which has a dominant direction that differs from its neighboring line-segments. Within each line-segment, the dominant direction of the line is the same. However, when crossing the boundary between two line-segments, the dominant direction changes.

The geometric meaning of "line" as a set of points extending infinitely in both directions is not useful in a discussion of a volumetric display having finite extent. Hence, throughout this specification, the word "line" generally refers to line-segments defined by two endpoints. With this definition, it becomes meaningful to refer to lines as being "short" or "long." A "short line" is a line-segment whose length is short relative to the extent of the volumetric display. A "long line" is a line-segment other than a short line.

In the rasterization method of the invention, the rasterizer 6 begins at one endpoint of the line and identifies the dominant direction of the line-segment containing that endpoint. To reach the next point on the line, the rasterizer 6 first increments the value of the coordinate (hereafter referred to as the "dominant coordinate) associated with the dominant direction for that line-segment. Then, the rasterizer 6 decides whether to increment the values of coordinates associated with one or the other non-dominant direction.

To determine whether to increment the values of the coordinates associated with the non-dominant directions, it is useful to define three discriminant functions, each of which defines a surface in the cylindrical coordinate system. Each of the three coordinates is an argument to two of these discriminant functions. The discriminant functions are selected so that the intersection of any two of them defines the desired line. For convenience of notation, these discriminant functions are referred to as:

$F(r,\theta)=0$ $G(r,h)=0$ $H(\theta,h)=0$

Figure 3:
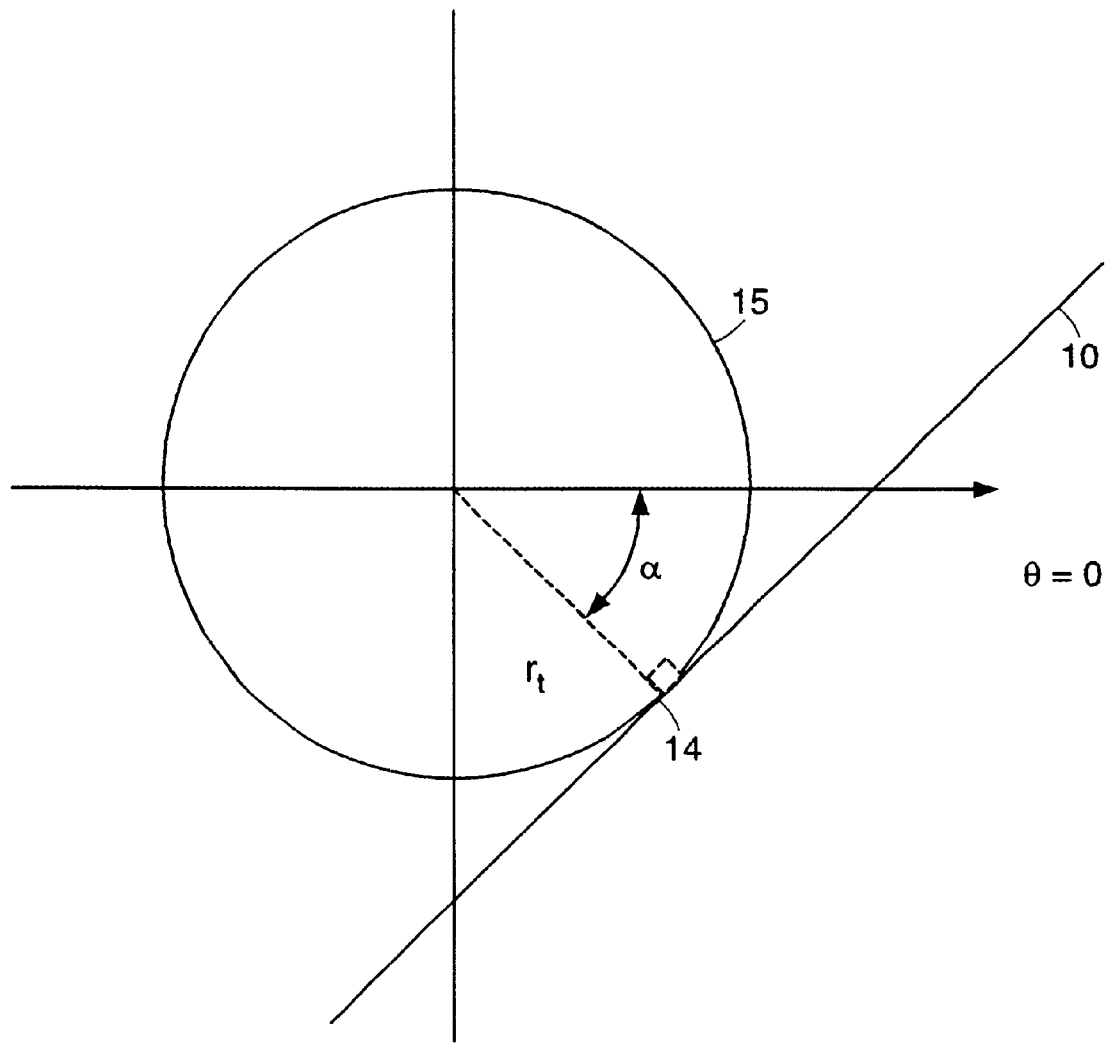
FIGS. 3–4 show two views of the desired line and a cylindrical surface to which it is tangent.
Figure 4:
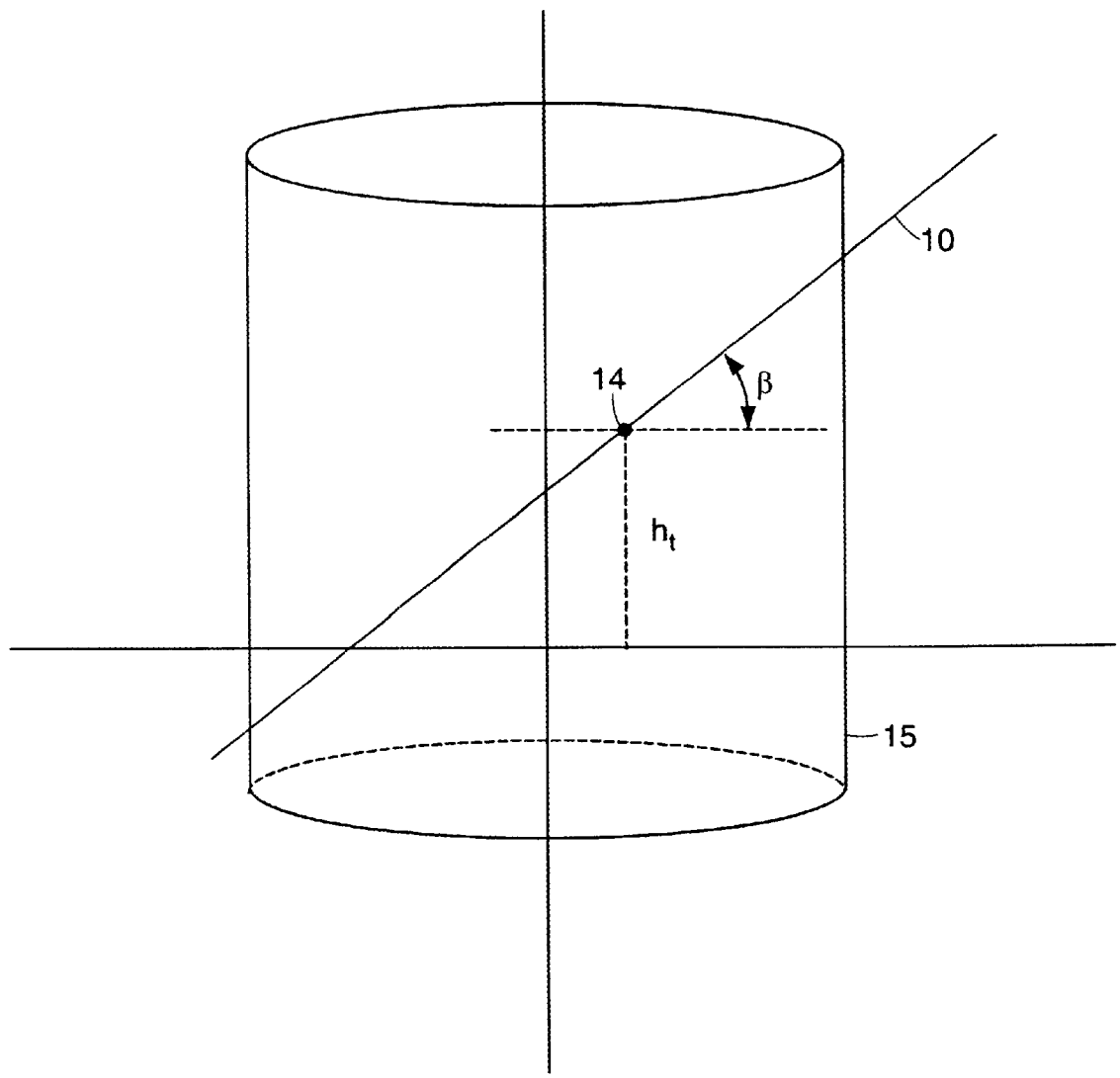

The functional forms of the above three discriminant functions are best understood with reference to FIGS. 3 and 4. As shown in those figures, a desired line 10 in cylindrical coordinates can be conveniently described in terms of four geometric measurements. A tangent plane containing the desired line 10 is defined by the line's 10 point of tangency 14 ($r_t,\alpha,h_t$) with a cylindrical surface 15. The specific line within this tangent plane is defined by the angle of twist, $\beta$, of the desired line 10 in the tangent plane.

Figure 5:
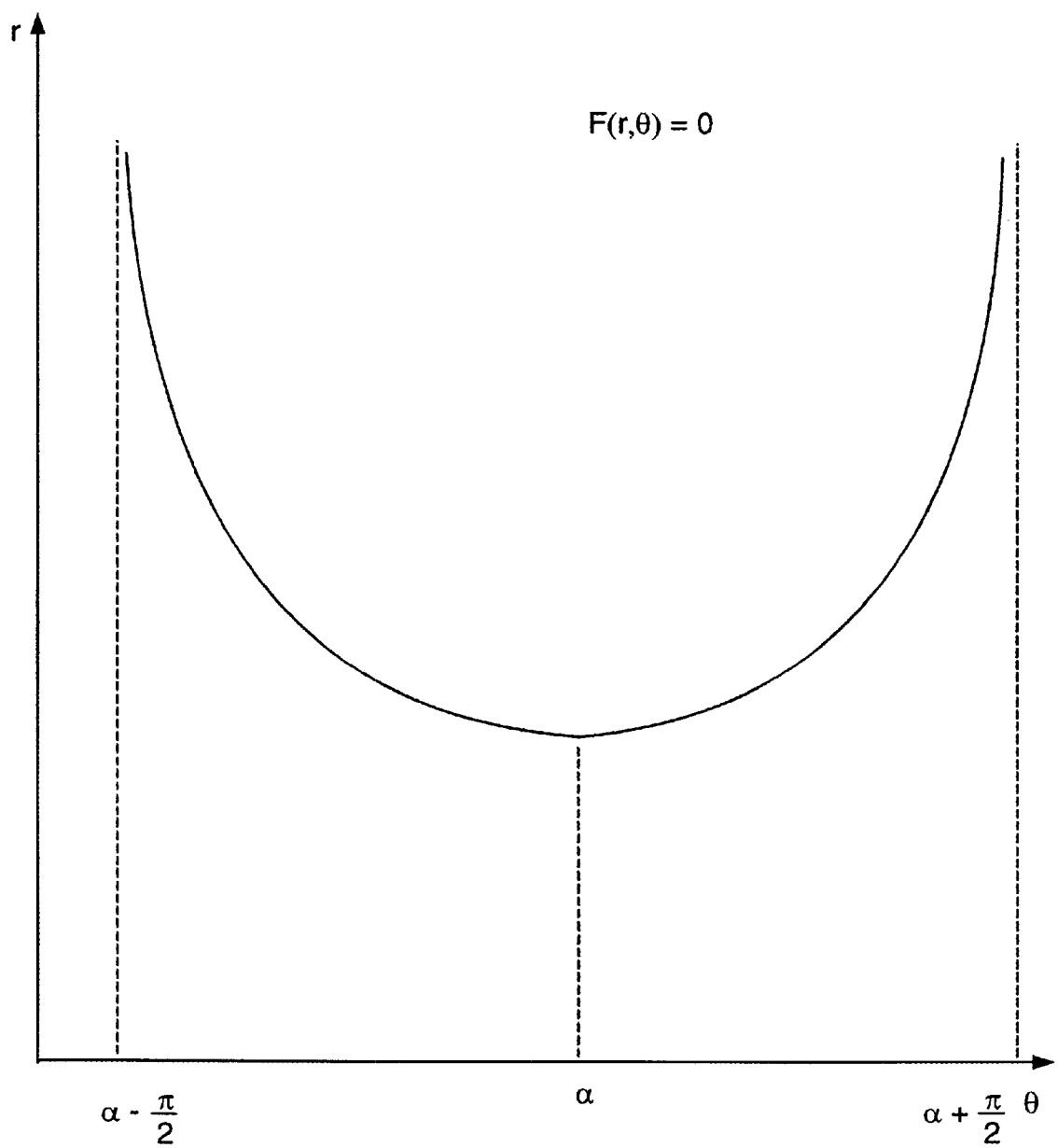
FIGS. 5, 6, 7A and 7B show curves derived from three discriminant functions used in rasterizing the desired line.

The first discriminant function, $F(r,\theta)$, is the projection of the desired line 10 onto a plane that is perpendicular to the axis of the cylindrical coordinate system:

$F(r,\theta)=r\cos(\theta-\alpha)-r_t=0$ where $r_t$ is the radial distance to the point of tangency 14 and $\alpha$ is the angular coordinate at the point of tangency 14. An intersection of the r–θ plane and the surface defined by $F(r,\theta)=0$ is shown in FIG. 5.

Figure 6:
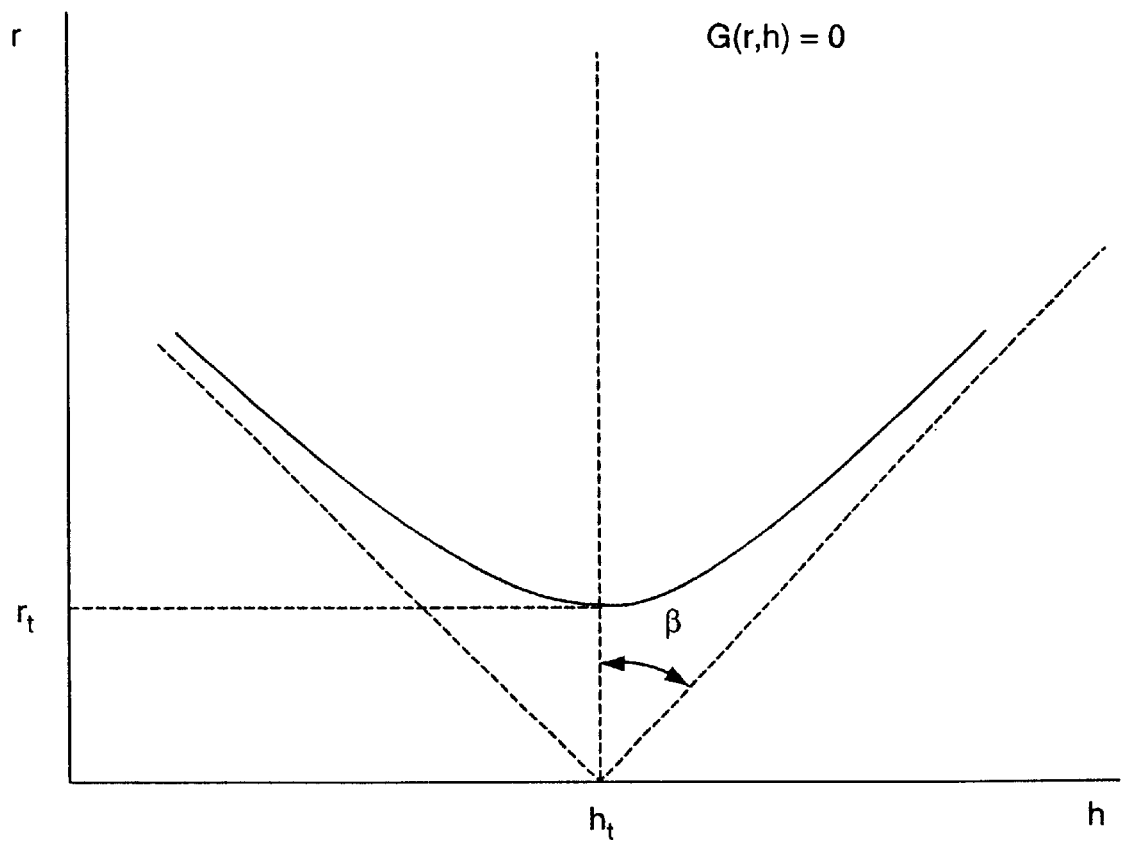

The second discriminant function, $G(r,h)$, is a positive branch of a hyperbola. The hyperbola has an axis of symmetry extending in the h direction and passing through the point of tangency 14 at ($r_t$, $h_t$). The angle formed by the r-axis and the hyperbola's asymptotes is $\beta$. The hyperbola is derived from the desired line 10 using the equation:

$G(r,h)=\eta(r^2-r_t^2)-(h-h_t)^2=0$ where $\eta$ is defined as $\tan^2(\beta)$. FIG. 6 shows the curve satisfying the constraint $G(r,h)=0$ in the r–h parametric domain.

Figure 7A:
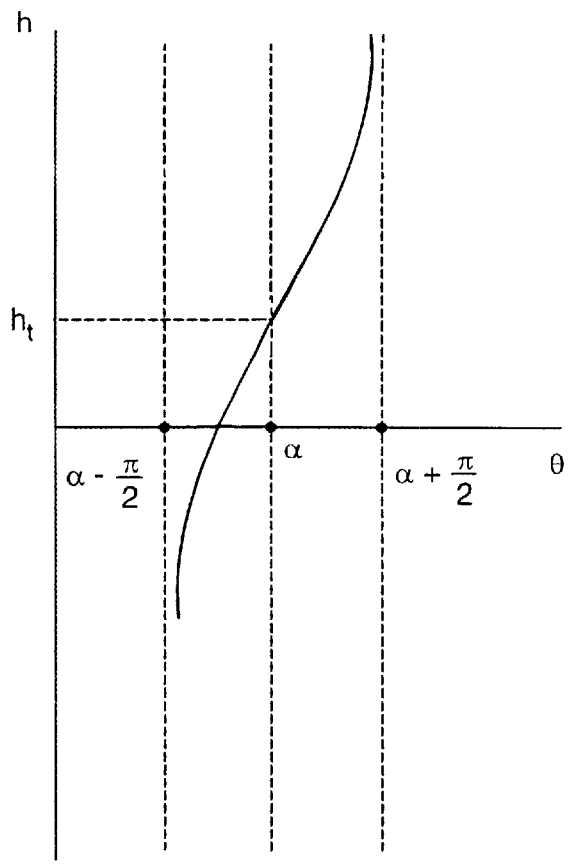
Figure 7B:
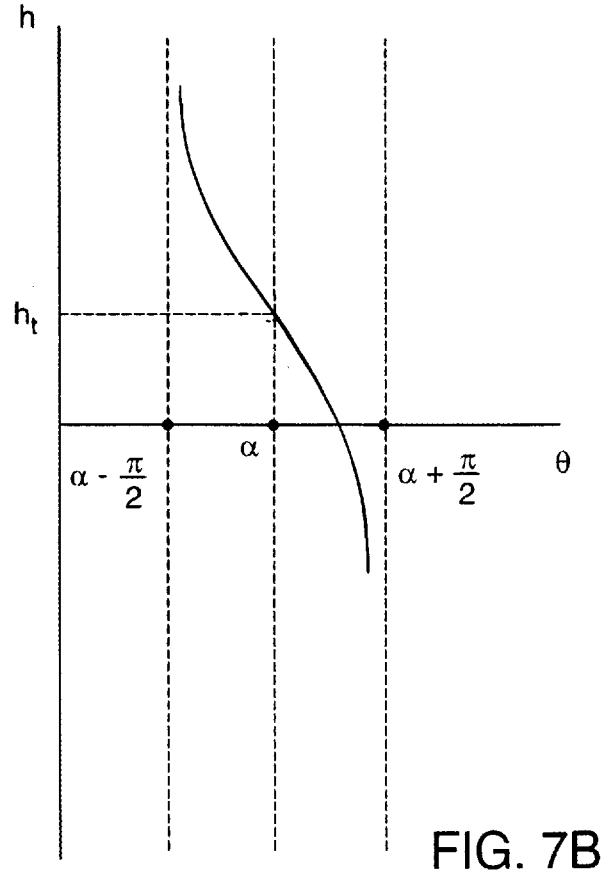

The third discriminant function, $H(h,\theta)$, defines a tangent function in the θ–h parametric domain. The inflection point of this tangent function is located at the point of tangency 14, ($\theta=\alpha,h=h_t$). The equation is given by:

$H(h,\theta)=\xi\tan(\theta-\alpha)+h_t-h=0$ where $\xi$ is defined to be $r_t\tan(\beta)$. FIGS. 7A and 7B show curves defined by $H(h,\theta)=0$ in the θ–h parametric domain corresponding to positive and negative values of $\xi$.

Note that unlike the first two discriminant functions, the sign of the slope of $H(h,\theta)$ changes depending on the sign of $\xi$. In implementing the third discriminant function, the rasterizer 6 can use two separate (but very similar functions). Alternatively, the rasterizer 6 can incorporate the sign of $\xi$ into a single function call. The use of two separate functions may be more efficient because doing so avoids extra operations associated with changing signs of subexpressions.

A dominant direction characterizes each point on the desired line 10. The dominant direction associated with a point on the desired line is that direction in which the coordinate for that direction changes most rapidly relative to the other coordinates. The rasterizer 6 identifies this direction by using the above three functions to evaluate the derivatives dr/dh, dr/dθ, and dh/dθ. Because of the constraints $F(r,\theta)=G(r,h)=H(h,\theta)=0$, it follows that $dF=dG=dH=0$. Hence, one obtains the following expressions:

$$\frac{dr}{d\theta} = r\tan(\theta-\alpha)\frac{\text{radians}}{\text{step}}$$

$$\frac{dr}{dh} = \frac{h-h_t}{\eta r}$$

$$\frac{dh}{d\theta} = \xi\sec^2(\theta-\alpha)\frac{\text{radians}}{\text{step}}$$

To improve performance, angular coordinates are expressed as dimensionless integers rather than in radians. A "radians/step" constant for converting between dimensionless integers and radians is therefore incorporated within the θ argument of the trigonometric functions. The scale factor "radians/step" that appears in the first and third derivatives thus arises from the chain rule of elementary calculus.

Given a point on the desired line 10, one can evaluate the three discriminant functions $F(r,\theta)$, $G(r,h)$ and $H(h,\theta)$. The derivatives of these three functions at that point on the desired line 10 identify the dominant direction at that point. Once the dominant direction is known, there exist known midpoint methods for determining successive voxels, thereby generating a rasterized line that approximates the desired line 10.

Because of the time required to evaluate the three discriminant functions and their derivatives at each point on the desired line 10, it is preferable to instead predict the progression of dominance one encounters while progressing along the desired line 10 and to identify indicia of a change in the dominant direction of the desired line 10. For a line in cylindrical coordinates, a dominance progression can be derived by observing the behavior of the three discriminant functions as θ proceeds from $\theta=\alpha-\pi/2$ to $\theta=\alpha+\pi/2$.

The dominance progression for the discriminant function $F(r,\theta)$ is that of a secant function. As θ increases, $F(r,\theta)$, and hence the desired line 10 from which it was derived, progresses from being r-dominant, to being θ-dominant, and then back to being r-dominant.

The dominance progression for the discriminant function $G(r,h)$ is that of one branch of a hyperbola. In this case, the dominance progression depends on the slopes of the asymptotes. If the slopes of the asymptotes have a magnitude greater than one, then $G(r,h)$, and hence the desired line 10 from which it was derived, progresses from being r-dominant, to being h-dominant, and then back to being r-dominant, switching sign at the point of tangency 14 ($h_t,r_t$). However, if the slopes of the asymptotes have magnitudes that are less than one, the hyperbola never becomes r-dominant. Under these circumstances, h is more dominant than r at all points on the desired line 10. Geometrically this corresponds to a desired line 10 that is nearly parallel to the cylindrical axis.

The third discriminant function, the tangent function $H(h,\theta)$, generally progresses from being h-dominant, to being $\theta$-dominant and finally back to being h-dominant. However, the minimum slope of a tangent function is equal to its coefficient, $\xi$. Hence, if $\xi$ is greater than one, then the slope of the tangent function $H(h,\theta)$ is everywhere greater than one. Thus it is possible for a line to be h-dominant everywhere and never $\theta$-dominant. Geometrically this corresponds to a desired line 10 for which either $r_t$ is large, or to a desired line 10 that is nearly parallel to the cylindrical axis.

The dominance progression for each of the three discriminant functions can therefore be summarized in the following table:

| | increasing $\theta \rightarrow$ | | |
|---|---|---|---|
| $F(r,\theta)$ | r | $\theta$ | r |
| $G(r,h)$ | (r) | h | (r) |
| $H(h,\theta)$ | h | $(\theta)$ | h |

In the above table, parentheses enclose those coordinates that, for certain lines, may never become dominant. Note that the inflection point on each of these three discriminant functions coincides with the line's point of tangency 14 $(r_t,\alpha,h_t)$ with the cylindrical surface 15.

The middle column of the table indicates that at the point of tangency 14, r can never be dominant. At that point, only $\theta$ or h can be dominant. Which of the two is dominant can be determined by observing the behavior of $H(h,\theta)$. The dominance progression for $H(h,\theta)$ indicates that if there exists a segment on the desired line 10 in which $\theta$ is more dominant than h, the point on that line at which $\theta=\alpha$ will be in that region. Consequently, $\theta$ dominance, if present at all, will manifest itself near the $\theta=\alpha$ point on the line.

Proceeding outward from the $\theta=\alpha$ point on the desired line 10, the next coordinate to become dominant will be either r or h. The dominance progression of the hyperbola, $G(r,h)$ indicates which one it will be. Based on the dominance progression of $G(r,h)$, it is apparent that if there exists an h-dominant line-segment on the desired line 10, that line-segment will be closer to the point of tangency 14 than any r-dominant segment.

Based on the foregoing, it is always the case that, in traversing a line in cylindrical coordinates from $\theta=\alpha-\pi/2$ to $\theta=\alpha+\pi/2$, the dominant directions of the consecutive line-segments that constitute the desired line 10 will progress in the following order:

$$r \rightarrow h \rightarrow \theta \rightarrow h \rightarrow r$$

Note that the above dominance progression does not require that each direction be dominant at some point on the desired line 10. Instead, the above dominance progression states that if the desired line 10 includes a line-segment in which a particular direction dominates, then that line-segment will appear in relation to the other line-segments as indicated above. In referring to a line-segment, a "+" or "−" sign indicates whether that line-segment lies before the point of tangency 14 or after the point of tangency 14. Thus the constituent line-segments of the desired line 10 are conveniently labeled as follows:

$$R^- \rightarrow H^- \rightarrow \theta^- \rightarrow \theta^+ \rightarrow H^+ \rightarrow R^-$$

The recognition of the foregoing dominance progression in any line in cylindrical coordinates enables the implementation of a rasterization method that does not require computationally expensive evaluation of the three discriminant functions to identify the dominant direction at each point on the line. Instead, rasterization proceeds following steps shown in FIG. 8.

Figure 8:
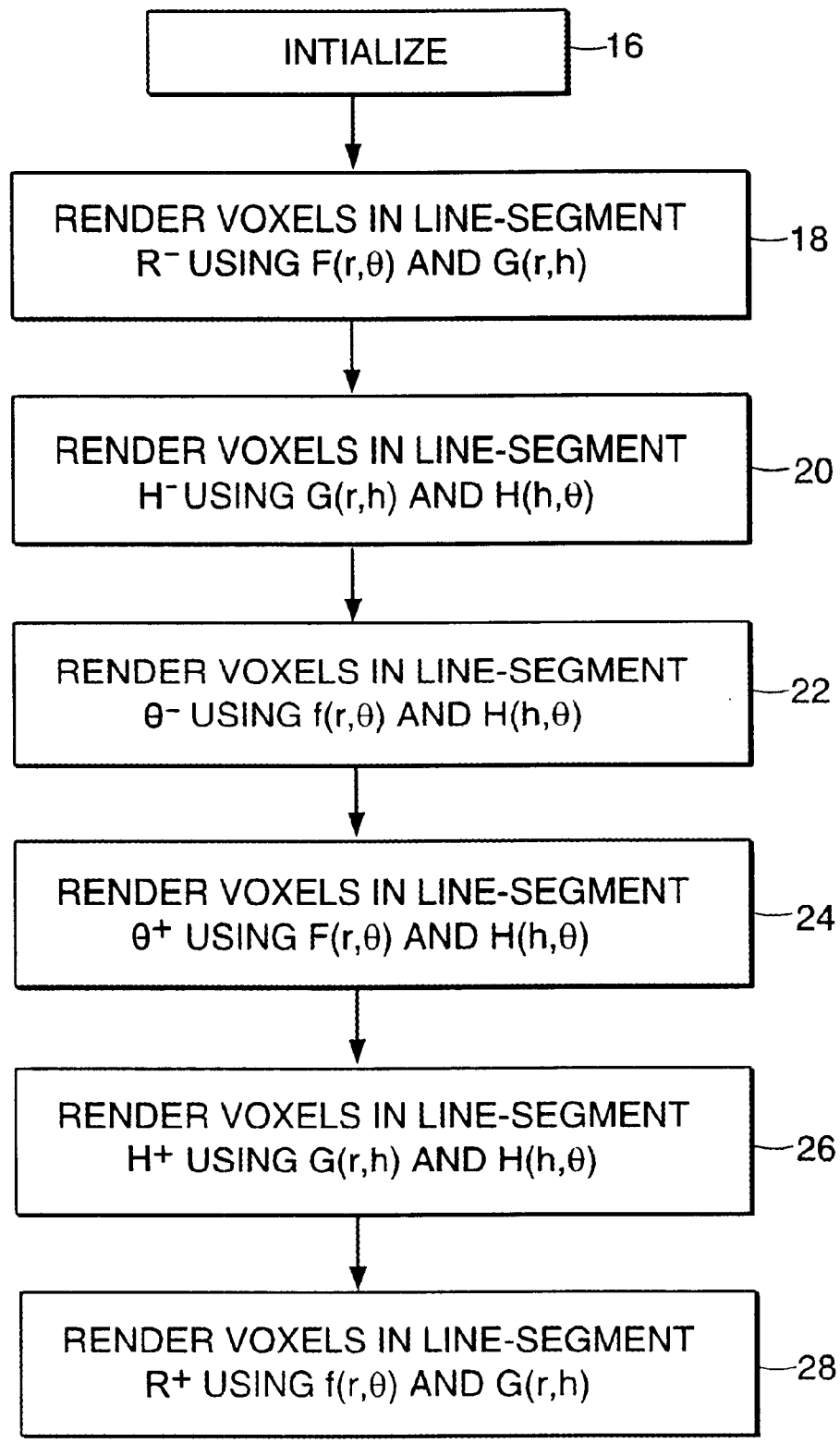
FIG. 8 is a flow chart summarizing the steps in the practice of the invention.

The rasterization method shown in FIG. 8 begins with an initialization step in which the rasterizer 6 renders the first voxel (step 16). This first voxel corresponds to a first endpoint of the desired line 10. The first endpoint is selected so that traversing the desired line 10 from the first endpoint to the second endpoint results in a decreasing r coordinate followed by an increasing r coordinate.

The initialization step is followed by steps in which the rasterizer 6 proceeds from one constituent line-segment of the desired line 10 to the next. Within a constituent line-segment, the rasterizer 6 steps unconditionally in the dominant direction of the line-segment. It then determines whether or not to also step in the non-dominant directions. To do so, the rasterizer 6 evaluates a discriminant function (one of $F(r,\theta)$, $G(r,h)$, or $H(h,\theta)$) associated with each of the other two non-dominant directions. After rendering each voxel, the rasterizer 6 updates all the slope values for the discriminant functions and checks to see if the next point is within the same line-segment.

Following the initialization step, the rasterizer 6 renders voxels representative of points in the $R^{31}$ line-segment of the desired line 10, if any (step 18). In doing so, the rasterizer 6 evaluates the signs of the first and second discriminant functions, $F(r,\theta)$ and $G(r,h)$, to determine whether to step in the $\theta$ and h directions respectively. Before rendering a voxel representative of a point on the desired line 10, the rasterizer 6 verifies that that point is still in the $R^-$ line-segment of the desired line 10. If it is not, then the rasterizer 6 moves to the step of rendering voxels representative of points on the $H^-$ line-segment of the desired line 10, if any (step 20).

Once the rasterizer 6 determines that it has crossed over into the $H^-$ line-segment of the line, it evaluates the signs of the second and third discriminant functions, $G(r,h)$ and $H(h,\theta)$, to determine whether to step in the r and $\theta$ directions respectively. Before rendering a voxel representative of a point on the desired line 10, the rasterizer 6 checks to see if that point is still in the $H^-$ line-segment of the desired line 10. If it is not, then the rasterizer 6 moves to the step of rendering voxels representative of points on the $\theta^-$ line-segment of the desired line 10, if any (step 22).

Once the rasterizer 6 determines that it has crossed over into the $\theta$-line-segment of the line, it evaluates the signs of the first and third discriminant functions, $F(r,\theta)$ and $H(h,\theta)$, to determine where to step in the r and h directions respectively. The rasterizer 6 continues to operate in this manner as long as $\theta$ remains the dominant direction. Hence, the rasterizer 6 operates in this manner even after crossing over into the $\theta^+$ line-segment of the desired line 10 (step 24).

Once in the $\theta^+$ line-segment of the desired line 10, the rasterizer 6 checks to see if the next point to be drawn is still in the $\theta^+$ line-segment of the desired line 10. If it is not, then the rasterizer 6 moves to the steps of rendering voxels representing points on the $H^+$ line-segment of the line (step 26), if any, and voxels representing points on the $R^+$ line-segment of the line (step 28), if any. These steps are carried out in a manner analogous to the earlier steps of rendering voxels representing points in the $H^-$ and $R^-$ line-segments of the desired line 10.

To locate the boundaries of the constituent line-segments of the desired line 10, the rasterizer 6 determines the slope of the discriminant function with respect to the currently dominant variable. If this slope transitions from being less than one to being greater than one (or vice versa), the rasterizer 6 interprets this as indicating that it has now crossed into a different constituent line-segment of the desired line 10 and that the dominant direction has changed in accordance with the progression of dominance identified above.

Figure 9:
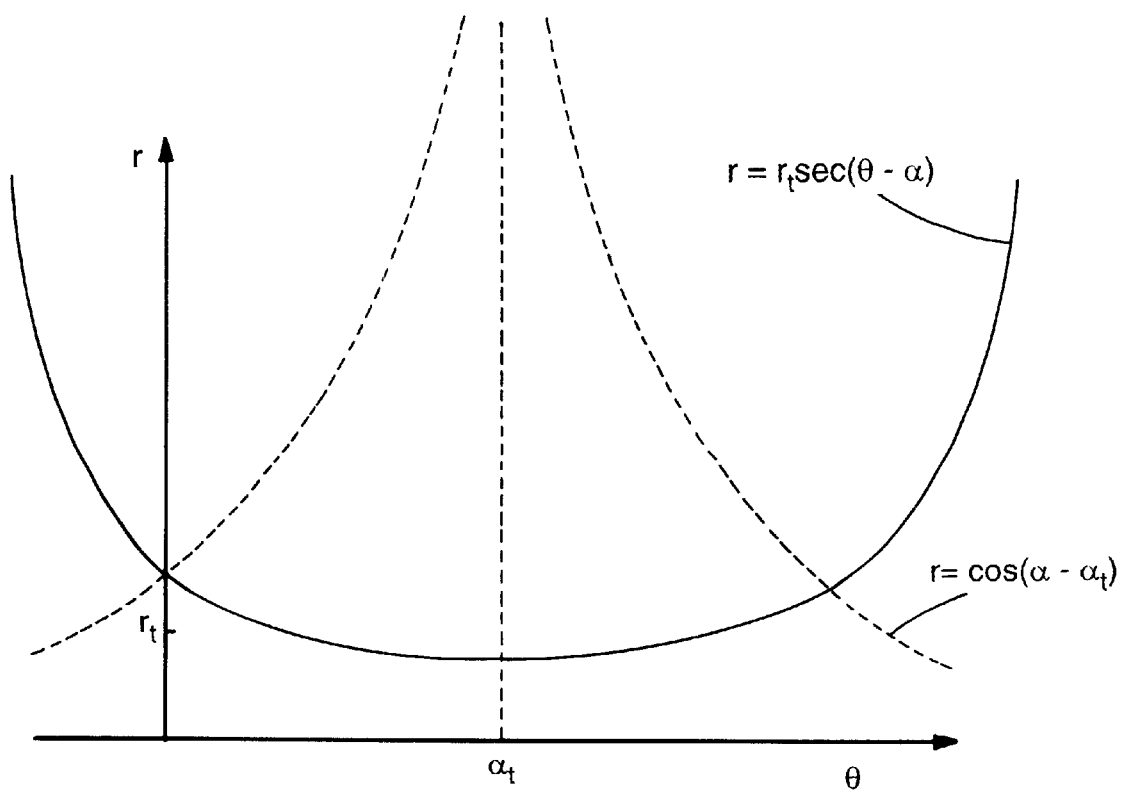
FIGS. 9–11 show curves derived from the three discriminant functions of FIGS. 6, 6, and 7A together with the locus of points for which their derivatives are equal to one.
Figure 10:
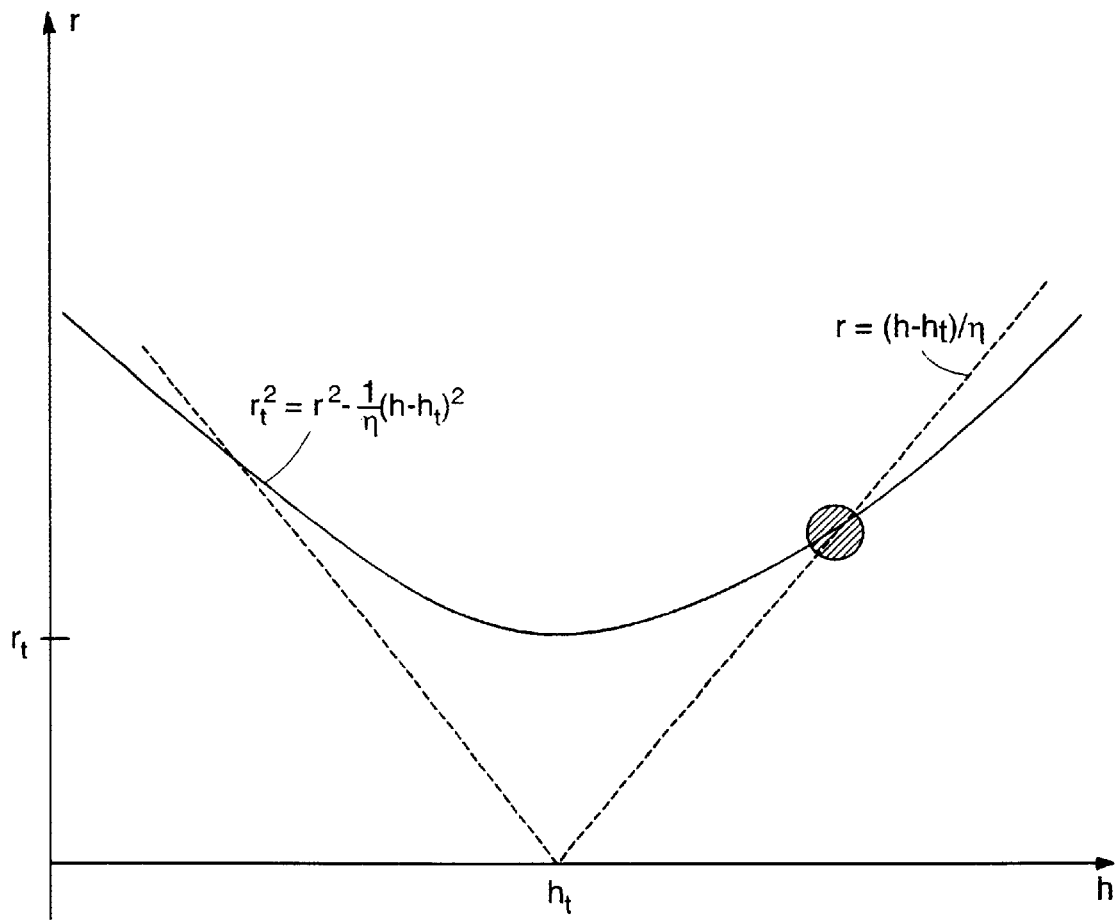
Figure 11:
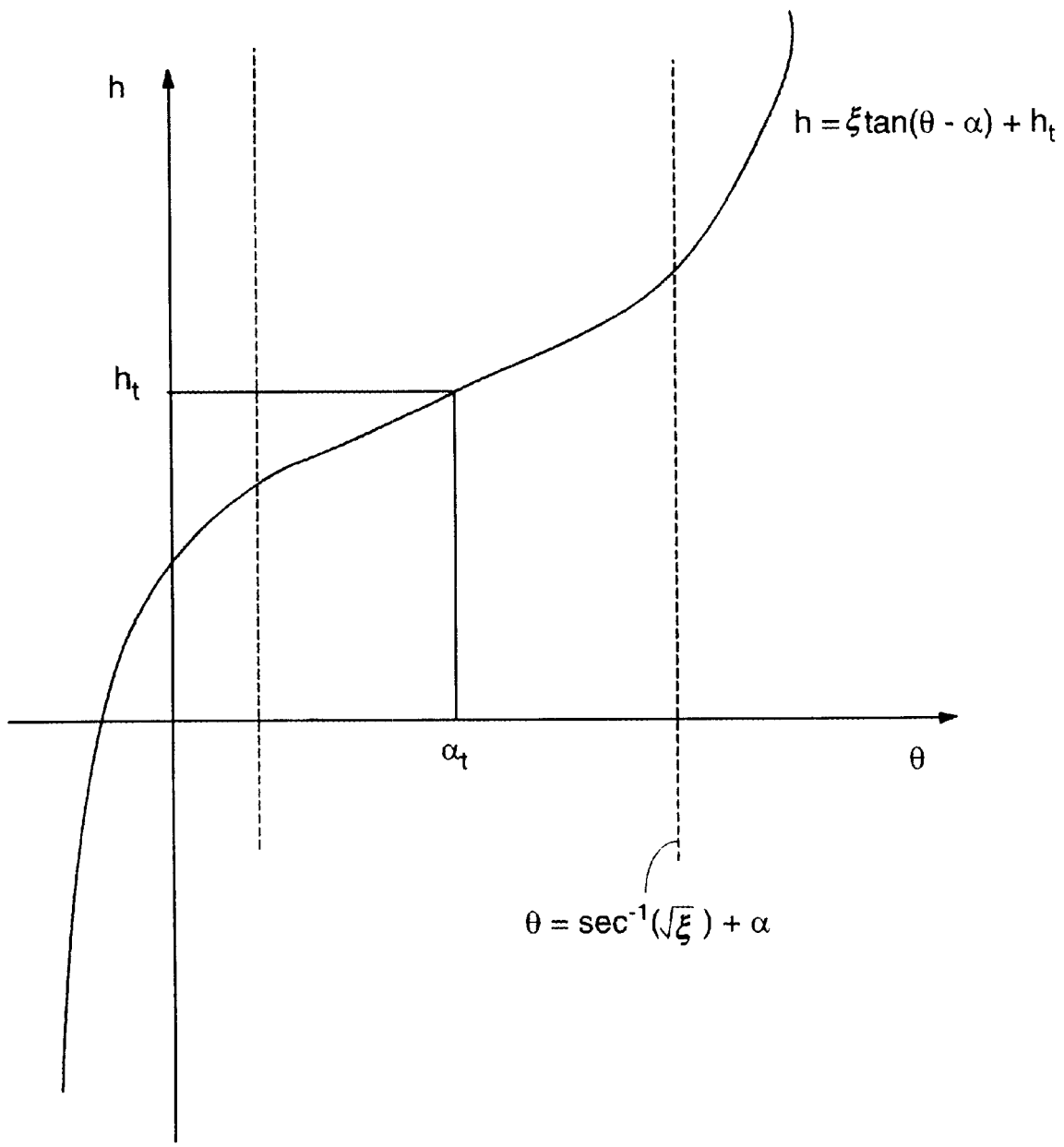

FIG. 9 shows the curve $F(r,\theta)=0$ (the solid curve) together with the locus of all points for which $dr/d\theta$ is equal to one (the dashed curve). As is apparent from the figure, there are only two points in r-θ space that are both on the discriminant function and for which $dr/d\theta$ is equal to one. These two points, which correspond to the intersections of the dashed curve and the solid curve in the figure, unambiguously identify the points at which the line transitions from one constituent line-segment to the next. FIGS. 10 and 11 show the curves $G(r,h)=0$ and $H(h,\theta)=0$ (solid curves) and the corresponding loci of points for which dr/dh and dh/dθ are equal to one. As shown in FIGS. 10 and 11, there are only two points in each case that are both on the discriminant function and for which the derivative is equal to one.

For each of the three cases above, there also exist points that almost, but do not quite satisfy the two conditions set forth for each case. These points correspond to those that are in the neighborhood of the intersection of the dashed and solid curves in FIGS. 9–11. One such set of erroneous points is illustrated by the shaded region in FIG. 10.

Because the only points that can be rendered on the display are those that fall on the cylindrical coordinate grid, it is possible that the rasterizer 6 will mistakenly consider one of the points in the set of erroneous points to be the actual intersection of the dashed and solid curves. This may result in the rasterizer 6 assuming that a transition from one constituent line-segment to the next has occurred when in fact, no such transition has occurred.

For a desired line 10 whose discriminant functions are as shown in FIGS. 9–11, a numerical error of the type described above will have little or no practical consequences. This is because in each of FIGS. 9–11, all points in the set of erroneous points are proximate to the true intersection point of the dashed and solid curves.

Figure 12:
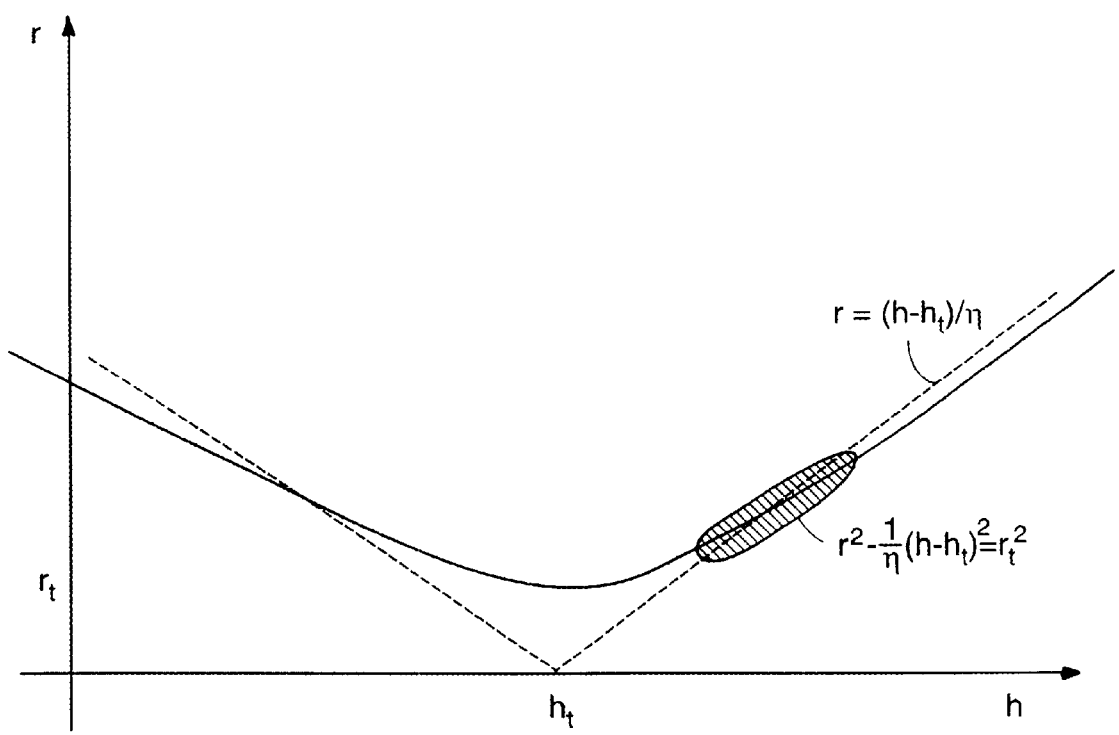
FIGS. 12–13 are examples of cases in which the proximity of a discriminant function to the locus of points in FIGS. 10 and 11 gives rise to numerical instability.

For some lines in a cylindrical coordinate system, however, the set of erroneous points can extend further away from the true intersection point of the dashed and solid curves. For example, referring back to FIG. 4, when the angle of twist β in the tangent plane approaches 45 degrees, tan(β) approaches one. When this occurs, the discriminant function G(r,h) and the locus of points for which dr/dh is equal to one become close to each other even at points that are far away from their intersection. In this case, the set of erroneous points, shown in FIG. 12, extends far beyond the intersection of the two curves. Under these circumstances, an erroneous selection of one of these points can results in a grossly premature transition from one constituent line-segment to the next.

Figure 13:
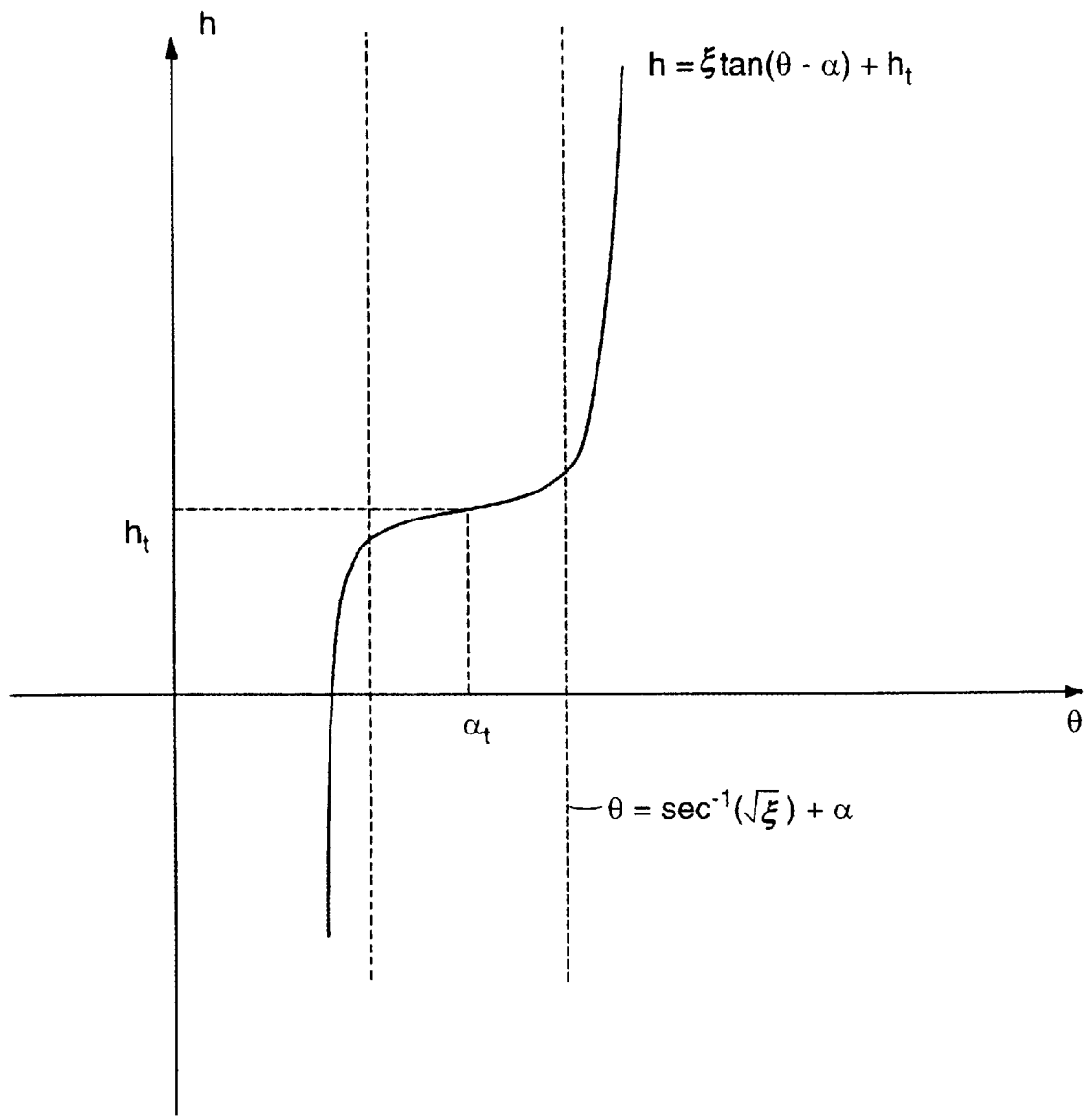

Another example of a desired line 10 that may result in a numerical error by the rasterizer 6 is one that passes very close to the cylindrical axis ($r_t \approx 0$) or one in which the desired line 10 lies mostly in the r-theta plane ($\beta \approx 0$). In either of these cases, ξ approaches zero. This causes the vertical dashed lines of FIG. 11 to move outward toward the tail of the tangent function, as shown in FIG. 13. Under these circumstances, the vertically extending set of erroneous points can include erroneous points are far away from the actual intersection of the dashed lines and the solid curve. This again can result in an inappropriate transition from one constituent line-segment to the next.

One way to eliminate numerical errors of the type described above is to symbolically compute the coordinates of the actual intersection of the dashed and solid curves in FIGS. 9–11 and to use those coordinates as transition thresholds. In practice it suffices to compute only one of the two coordinates that define the intersection. Of the two coordinates that define the intersection point, the more reliable is the dominant coordinate. For example, when in an r-dominant line-segment the rasterizer 6 would compare the current value of r on the desired line 10 with the r coordinate of the intersection to determine whether to transition out of the r-dominant line-segment. In terms of FIGS. 9–11, the symbolically computed coordinate defines either a horizontal or vertical line which goes through the intersection point.

Using the equations for $F(r,\theta)$ and $dr/d\theta$, one can eliminate a common variable r and derive the following expression for a vertical line in FIG. 9:

$$Fi(\theta) = \cos^2(\theta - \alpha) - r_t \sin(\theta - \alpha)\frac{\text{radians}}{\text{step}}$$

Similarly, using the equations for G(r,h) and dr/dh, one can eliminate the common variable θ and derive the following equation for a horizontal line in FIG. 10:

$$Gi(r) = (1-\eta)r^2 - r^2$$

Finally, using the equations for $H(h,\theta)$ and dH/dθ, one can again eliminate the common variable θ and derive the following expression for a horizontal line in FIG. 11:

$$Hi(h) = (h - h_t)^2 - \left(hSgn \cdot \xi \frac{\text{steps}}{\text{rad}} - \xi^2\right)$$

These three transition-indicating expressions are used as substitutes for expressions that are prone to numerical instability under the circumstances set forth above. For example, if the rasterizer 6 is in the $R^{31}$ line-segment of a desired line 10, it can recognize a transition to a successor line-segment upon recognition of the truth of either one of the following Boolean expressions:

$$\frac{dr}{d\theta} > -1, \text{ or}$$

$$\frac{dr}{dh} \cdot hSgn > -1$$

However, the second expression is prone to numerical instability for certain lines. As a result, the Boolean expression $$\frac{dr}{dh} \cdot hSgn > -1$$

is replaced by a Boolean expression that uses the more stable transition-indicating expression Gi(r):

$$Gi(r) < 0.$$

The following table lists, for each constituent line-segment, a pair of Boolean expressions that can be used to indicate a transition from one constituent line-segment to another:

| Constituent line segment | Expression 1 | Expression 2 |
|---|---|---|
| R⁻ | $\frac{dr}{d\theta} > -1$ | $\frac{dr}{dh} \cdot hSgn > -1$ |
| H⁻ | $\frac{dh}{d\theta} \cdot hSgn < 1$ | $\frac{dr}{dh} \cdot hSgn < 0$ |
| θ⁻ | $\frac{dr}{d\theta} > 0$ | none |
| θ⁺ | $\frac{dr}{d\theta} \cdot hSgn > 1$ | $\frac{dr}{d\theta} > 1$ |
| H⁺ | $\frac{dr}{dh} \cdot hSgn > 1$ | none |
| R⁺ | none | none |

Certain of the foregoing Boolean expressions are prone to numerical instabilities. To avoid numerical instabilities, these Boolean expressions can be replaced by more stable Boolean expressions involving the transition-indicating expressions Fi, Gi and Hi. The following table lists alternative pairs of Boolean expressions for determining the occurrence of a transition between constituent line-segments. In the following table, all Boolean expressions that are prone to numerical instability have been replaced by more stable expressions involving the transition-indicating expressions Fi, Gi and Hi.

| Constituent line segment | Expression 1 | Expression 2 |
|---|---|---|
| R⁻ | $\frac{dr}{d\theta} > -1$ | Gi < 0 |
| H⁻ | Hi < 0 | h · hSgn > h_t · hSgn |
| θ⁻ | $\frac{dr}{d\theta} > 0$ | none |
| θ⁺ | $\frac{dr}{d\theta} \cdot hSgn > 1$ | Fi < 0 |
| H⁺ | Gi > 0 | none |
| R⁺ | none | none |

The code provided as an appendix below shows one implementation of a rasterizer according to the invention. However, it is to be understood that while the invention has been described in conjunction with the detailed description thereof, the foregoing description and the accompanying code is intended to illustrate and not limit the scope of the invention.

Having described the invention and a prederred embodiment thereof, we claim:

1. A method for rendering, on a volumetric display having a plurality of voxels, a rasterized line that approximates a desired line, said method comprising:
    rendering, on said volumetric display, a first voxel from said plurality of voxels, the first voxel being representative of a first point from said desired line, said first point being selected from a first constituent line-segment of said desired line, said first constituent line-segment having a first dominant direction;
    selecting a second point from said desired line;
    if said second point is on a second constituent line-segment of said desired line, said second constituent line-segment having a second dominant direction different from said first dominant direction, rendering a second voxel from said plurality of voxels, said second voxel being representative of said second point on said desired line and having a location that minimizes a distance between said second voxel and said second point on said desired line.

2. The method of claim 1 wherein determining whether said second point is on a second constituent line-segment of said desired line comprises
    evaluating a difference between a threshold and a transition-indicating expression evaluated at said second point, said difference being indicative of a transition from said first constituent line-segment to said second constituent line-segment.

3. The method of claim 2, further comprising determining said second dominant direction.

4. The method of claim 3, wherein determining said second dominant direction comprises selecting said second dominant direction from a subsequent direction in a predefined progression of dominant directions.

5. The method of claim 4, further comprising defining said progression of dominant directions to be a sequence consisting of:
    a radial direction followed by
    an axial direction followed by
    an angular direction, followed by
    said axial direction, followed by
    said radial direction.

6. The method of claim 2, further comprising selecting said transition indicating expression to include an expression indicative of a slope of said desired line at said second point.

7. The method of claim 6, wherein said first dominant direction defines first and second non-dominant directions and said slope is defined to be a ratio of how much said desired line changes in said first dominant direction with respect to a change in one of said first and second non-dominant directions.

8. The method of claim 6, wherein said transition indicating expression is selected to identify a line having a point at which said slope is equal to said threshold.

9. The method of claim 1, wherein rendering said second voxel comprises applying a midpoint method to select said second voxel from a plurality of candidate voxels.

10. The method of claim 1, further comprising defining a cylindrical coordinate system to identify said voxels.

11. A method of rendering, on a display having a plurality of voxels, a rasterized line that approximates a desired line, the method comprising:
    rendering a first voxel on said rasterized line, said first voxel being representative of a first point on said desired line;
    determining, on the basis of a local slope of said desired line and a sign of a discriminant of said desired line in a neighborhood of said first point, a direction relative to said first voxel of a second voxel on said rasterized line;
    rendering said second voxel on said rasterized line, said second voxel being displaced from said first voxel in said direction.

12. The method of claim 11 further comprising evaluating said discriminant at a midpoint between two candidate voxels from which said subsequent voxel is to be selected.

13. The method of claim 11 wherein determining a direction comprises partitioning said desired line into a plurality of constituent line-segments, each constituent line-segment being associated with a range of local slopes of said desired line.

14. The method of claim 13 further comprising updating said discriminant.

15. The method of claim 13 wherein updating said discriminant comprises:

incrementing said discriminant by a selected amount when said subsequent voxel is displaced from said first voxel in a first direction; and incorporating information indicative of a displacement of said second voxel in a second direction.

16. The method of claim 11, further comprising defining a cylindrical coordinate system to identify said voxels.

17. A volumetric display comprising:

a display surface rotatable about an axis;

an voxel-rendering element configured to render a selected voxel on said display surface; and a rasterizer in communication with said voxel-rendering element, said rasterizer being configured to direct said voxel-rendering element to render, on said display surface, a rasterized line that approximates a desired line by:

rendering, on said display surface, a first voxel defined by first coordinates, said first voxel being representative of a first point from said desired line, said first point being selected from a first constituent line-segment of said desired line, said first constituent line-segment having a first dominant direction;

selecting a second point from said desired line;

if said second point is on a second constituent line-segment of said desired line, said second constituent line-segment having a second dominant direction different from said first dominant direction, rendering a second voxel representative of said second point on said desired line, said second voxel having a location defined by second coordinates that minimizes a distance between said second voxel and said desired line.

18. The volumetric display of claim 17, wherein said rasterizing element is configured to identify said voxels in a cylindrical coordinate system.

19. A method for rendering, on a volumetric display having a plurality of voxels, a rasterized line that approximates a desired line, said method comprising:

if first and second points on the desired line are on first and second constituent line-segments of said desired line, said first and second constituent line-segments having different dominant directions, incrementally proceeding from a first voxel representative of said first point to a second voxel representative of said second point on said desired line, rendering said second voxel at a location defined by coordinates that minimizes a distance between said second voxel and said desired line.

20. The method of claim 19, further comprising defining a cylindrical coordinate system to identify said voxels.

* * * * *